United States Patent [19]

Seragnoli

[11] Patent Number: 4,511,045
[45] Date of Patent: Apr. 16, 1985

[54] DEVICE FOR TRANSFERRING AND VERIFYING BATCHES OF CIGARETTES

[75] Inventor: Enzo Seragnoli, Bologna, Italy

[73] Assignee: G.D. Società Per Azioni, Bologna, Italy

[21] Appl. No.: 343,753

[22] Filed: Jan. 28, 1982

[30] Foreign Application Priority Data

Mar. 6, 1981 [IT] Italy ................. 3358 A/81

[51] Int. Cl.³ ............................. B07C 5/00
[52] U.S. Cl. .......................... 209/535; 53/54; 209/936
[58] Field of Search ............... 209/535–537, 209/587, 591, 912, 936; 53/54, 500; 250/223 R

[56] References Cited

U.S. PATENT DOCUMENTS

| 2,922,519 | 1/1960 | Radley | 209/536 |
| 3,207,308 | 9/1965 | Kemp | 209/535 |
| 3,590,550 | 7/1971 | Gianese | 209/535 X |
| 3,863,491 | 2/1975 | Molins et al. | 209/537 X |
| 4,053,056 | 10/1977 | Day | 209/536 X |
| 4,209,955 | 7/1980 | Seragnoli | 209/536 X |
| 4,266,674 | 5/1981 | Bell et al. | 209/536 |
| 4,267,444 | 5/1981 | Bald | 209/536 X |

FOREIGN PATENT DOCUMENTS

| 0974463 | 11/1964 | United Kingdom | 209/535 |
| 1479926 | 7/1977 | United Kingdom | |
| 1509206 | 5/1978 | United Kingdom | |
| 2050805 | 1/1981 | United Kingdom | |

Primary Examiner—Robert B. Reeves
Assistant Examiner—Edward M. Wacyra
Attorney, Agent, or Firm—Cushman, Darby & Cushman

[57] ABSTRACT

A device for transferring and verifying batches of cigarettes, placed transversely with respect to the direction in which they move forward and in superposed layers. Miniaturized reflection photocells in a number identical to the number of layers composing the cigarette batches are provided for checking cigarette ends. As each batch passes, each of the elements emits a signal in response to the performed check. These signals, converted into logical form by a first circuit block, pass into a second circuit block which, synchronized with cyclic signals indicative of the checking elements examining the central areas of the ends of the cigarettes, constitutes means for operating an ejector device.

2 Claims, 5 Drawing Figures

DEVICE FOR TRANSFERRING AND VERIFYING BATCHES OF CIGARETTES

BACKGROUND OF THE INVENTION

The invention relates to a device for transferring and verifying batches of cigarettes for ultimate delivery to the wrapping line of a packeting machine.

DESCRIPTION OF THE PRIOR ART

The known practice is for the said batches, generally constituted by a plurality of superposed layers of cigarettes, to be contained in compartments on an endless conveyor that moves forward intermittently. Frequently, the batches inside the compartments are either incomplete or have in them one or more cigarettes that are faulty because of insufficient end filling with tobacco, or the absence of a filter.

For the purpose of detecting faulty batches that have to be ejected, the prior art has verification devices placed along the path of the conveyor.

These devices may be electromechanical, and have for each cigarette one feeler member in cases where one single end has to be checked, or two feeler members when a check has to be made on both ends. During each pause of the intermittently moving conveyor, the said feeler members are placed at the side of the positions occupied by the ends of the cigarettes and they verify the end filling and/or that a filter is present, plus the completeness of the batch.

The result of this checking operation is then sent, via a memory device, to an ejector placed along the path of the endless conveyor to expel the faulty batches.

Verification devices of electrical type are also known, and in these the feeler members are replaced with an identical number of optical sensors, each of which comprises a photoemitter element, a photosensitive element and an electrical circuit.

In both cases described, each verification device is constituted by a number of virtually independent devices, each of which checks the end of one particular cigarette in the batch.

Consequently, not only are these prior art devices complicated and costly, but they are also extremely large.

SUMMARY OF THE INVENTION

The object of the present invention is to provide a verification device that is able to overcome all the aforementioned problems and, more precisely, a device that is simple, inexpensive and small compared with the prior art.

This and other objects are all attained with the device for transferring and verifying batches of cigarettes comprising a conveyor, provided with compartments for containing batches of cigarettes placed transversely with respect to the direction in which the conveyor moves forward and arranged in layers at different levels with respect to the said conveyor, and comprising a device for checking at least one end of each of the said cigarettes and a device for ejecting batches that are incomplete and/or contain at least one faulty cigarette, wherein the verification device comprises a checking element for each of the said layers, a first circuit block connected to each of the said checking elements (for the emission of a signal subsequent to the operation of checking the layer concerned) a device linked with mechanical means connected to the said conveyor (for the emission of a cyclic signal synchronized with the said operation of checking the said layers) and a second circuit block for uniting with the signals of the said first circuit blocks and, synchronized with the said cyclic signal, for operating the said ejector means.

BRIEF DESCRIPTION OF THE DRAWINGS

Further characteristics and advantages of the device according to the invention will become more apparent from the detailed description that follows of the presently preferred form of embodiment, illustrative only, by way of the accompanying drawings, in which.

DESCRIPTION OF THE PREFERRED EMBODIMENT

Figure 1:
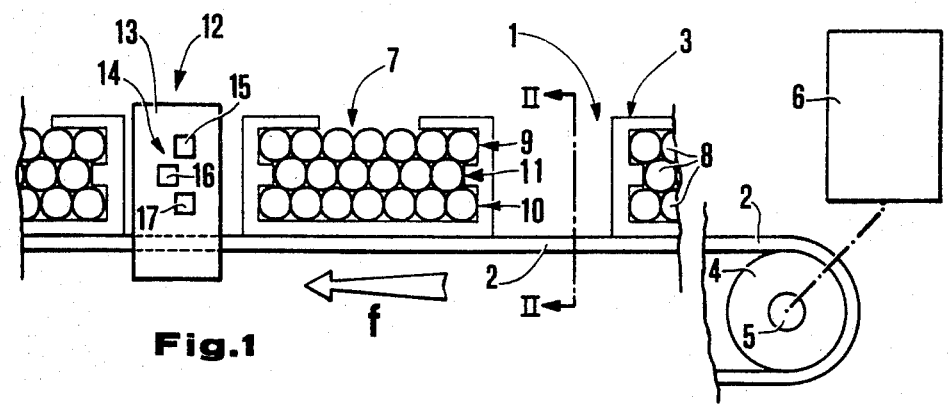
FIG. 1 shows, in a front view, a conveyor for batches of cigarettes that is provided with the device according to the invention.
Figure 2:
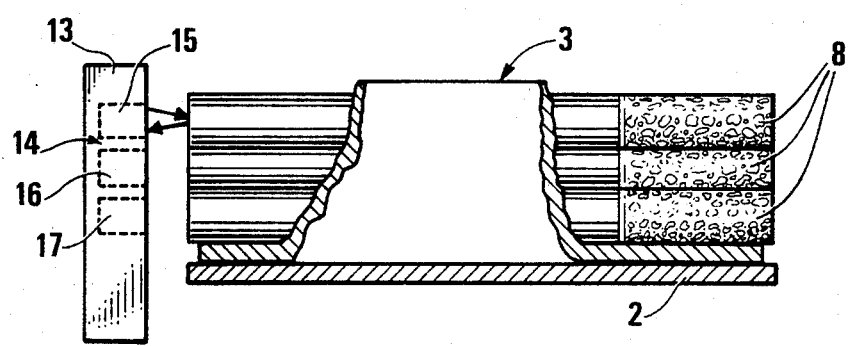
FIG. 2 shows, in sectional form, a view along the line II—II in FIG. 1.

With reference to FIG. 1, shown by 1 there is a conveyor that moves forward intermittently in the direction of the arrow f, and is constituted by an endless belt 2 on which are fixed, at a constant distance apart, compartments 3.

The belt 2 is wound endlessly around end rollers, one of which is shown at 4 and mounted on a shaft 5 in FIG. 1.

A device of a known type (that is shown diagrammatically in the block 6, and whose motion is derived from a non-illustrated machine drive shaft), passes an intermittent rotatory movement onto the shaft 5.

The compartments 3 define internally substantially parallelepiped spaces for the containment of batches 7 of twenty cigarettes 8 that are placed transversely to the direction in which the belt 2 moves forward.

The batches 7, the formation of which is taken care of by non-illustrated means of a known type, are constituted by three layers; more precisely, by an upper layer 9 and by a bottom layer 10, both of seven cigarettes, in between which is interposed a layer 11 of six cigarettes.

The space of the missing cigarette in the middle row is occupied by two ribs that extend into the inside of said compartment 3 from the opposite lateral walls thereof for a distance that is virtually identical to the radius of one cigarette.

Along the path of the conveyor 1, at a checking position 12, a plate 13 that lies in a plane perpendicular to the axes of the cigarettes 8 and is close to the front edge (as viewed in FIG. 1) of the belt 2, constitutes an element for supporting a verification device shown at 14.

The device 14 comprises three optical detector elements 15, 16 and 17, constituted by miniaturized reflection photocells placed at the level of the layers 9, 11 and 10, respectively, and seated in housings machined in the plate 13.

While the detector elements 15 and 17 are placed along the same vertical line, the element 16 for the middle layer 11 is placed to the left of this line (looking at FIG. 1) and away from this at a distance virtually identical to the radius of one cigarette.

With each step of the belt 2, a batch 7 of cigarettes 8 contained in one compartment 3 crosses the checking position 12 so that the three layers of cigarettes 9, 11 and 10 contained therein are examined by the elements 15, 16 and 17, respectively.

Figure 3:
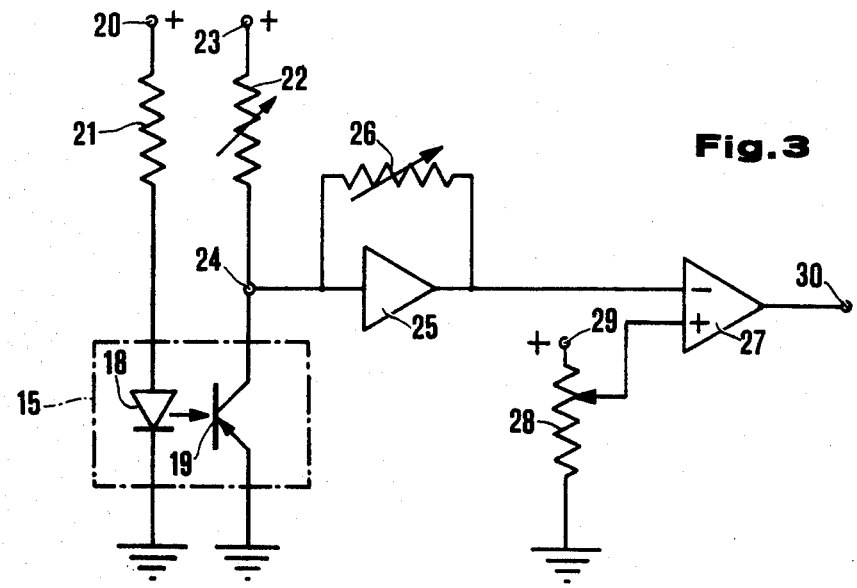
FIG. 3 shows a first electrical circuit block for the device according to the invention.

FIG. 3 shows a circuit block associated with reflection photocell 15, placed at the upper level. The photocell 15 comprises a photoemitter element 18 and a photosensitive receiver element 19.

The photoemitter element 18 (which in the example shown in FIG. 3 is constituted by an LED (light emitting diode) with the base connected to earth and the emitter connected to a positive pole 20 via a resistor 21) focuses a ray of light in the direction of the conveyor 1.

When this ray is intercepted by the ends of the cigarettes that form the upper layers 9 of the batches 7, it is reflected towards the photosensitive element 19.

In the example shown in FIG. 3, the latter is constituted by a phototransistor with the emitter connected to earth and the collector connected, through a potentiometer 22, to a positive pole 23 of a direct current voltage generator.

Shown at 24 is the output terminal of the reflection photocell 15, on which is present a signal dependent on the distance between the photoemitter element 18 and the reflecting body. The terminal 24 is connected to the input of an operational amplifier 25, the gain of which can be regulated by means of a feedback resistor 26.

The output of the operational amplifier 25 is connected to the negative or inverting input of a decision element constituted by a comparator 27. The second input of the latter is connected to a positive pole 29 via a rheostat 28.

In this way, a reference or threshold voltage that can be regulated through the rheostat 28 is present at the positive input of the comparator 27.

Figure 4:
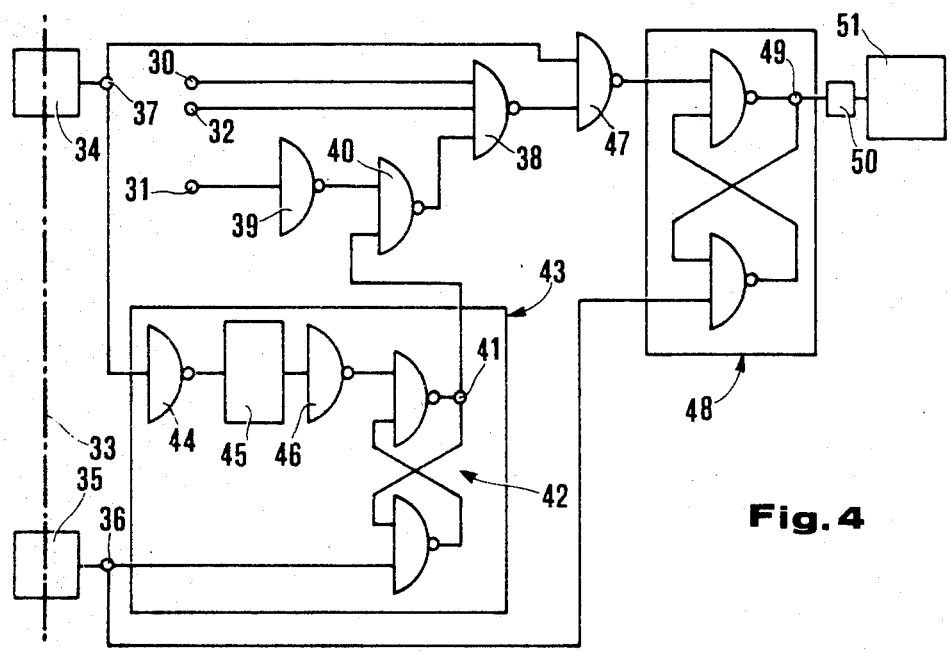
FIG. 4 shows a second electrical circuit block for the device according to the invention.

At 30 is shown the output terminal of the comparator 27 (see also FIG. 4).

To the detector elements 16 and 17 (respectively concerned with the middle layer 11 and the bottom layer 10) are wired two circuit blocks, not illustrated since they are identical to the one shown in FIG. 3, provided with output terminals 31 and 32, respectively (see FIG. 4).

With reference to FIG. 4, shown at 33 is a continuously rotating machine shaft that is connected mechanically through device 6 to the conveyor 1.

Coupled to the shaft 33, that completes a rotation through 360° with each intermittent movement of the conveyor 1, there are two devices shown at 34 and 35. These can comprise, for example, toothed disks integral with the shaft 33 and detector devices of the photoelectric or magnetic type.

Figure 5:
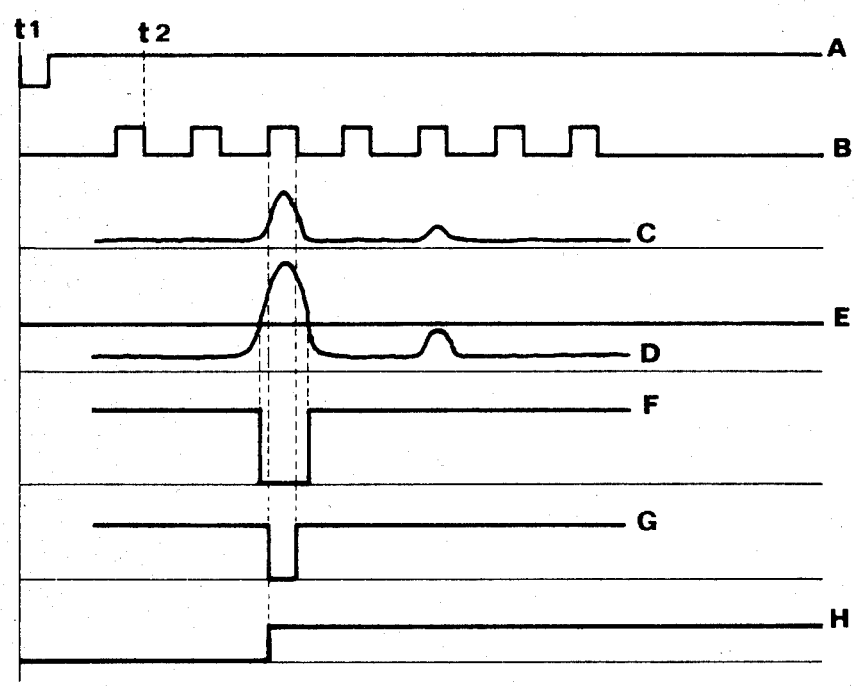
FIG. 5 shows, indicatively, some of the signals present at points of the circuits in FIGS. 3 and 4.

More precisely, the device 35 supplies to an output terminal 36 a logical level 1 signal interrupted by a logical level 0 impulse, this corresponding to the commencement of each forward movement of the conveyor 1 (see signal A in FIG. 5). This impulse will subsequently be referred to as the "cycle commencement impulse".

The device 34 supplies at each cycle to an output terminal 37 a succession of logical level 1 rectangular impulses, subsequently referred to as "consent impulses", at a time corresponding to the moments when the central areas of the cigarettes constituting the three layers of each batch 7 are examined by the photoemitter elements concerned (see signal B in FIG. 5).

The output terminals 30 and 32 are directly connected to a first and a second input of a triple input NAND logical element 38. The output terminal 31 is connected, via a NAND element 39, to a first input of a twin input NAND element 40, the output of which terminates at the third input of the NAND element 38. The second input of the NAND element 40 is connected to an output terminal 41 of a flip-flop 42 belonging to a circuit block shown in its entirety at 43 and provided with two inputs that are connected to the terminal 37 and to the terminal 36, respectively.

More precisely, the block 43 comprises, with a cascade connection, a NAND element 44 for inverting the signal forthcoming from the terminal 37, a shunter block 45 designed to supply a rectangular output signal corresponding to the leading edge of the input signal, and a second NAND element 46 connected to a first input of the flip-flop 42.

A second input of the flip-flop 42 is connected to the terminal 36.

The output of the triple input NAND element 38 is connected to the input of a NAND element 47. A second input of the latter is connected to the terminal 37. The output of the NAND element 47 is connected to one input of a flip-flop 48, the second input of which is connected to the terminal 36.

An output terminal 49 of a circuit block, comprised of the NAND element 38, the NAND element 47 and the flip-flop 48, is connected, via a time delay circuit 50, to an ejector device 51.

The operation of the device according to the invention is as follows.

Upon completion of a pause in motion, the conveyor 1 commences, under the action of the device 6 and synchronized with the emission of a cycle commencement impulse on the part of the device 35 (see signal A in FIG. 5), a forward movement phase.

A compartment 3, which during the previous operating cycle has arrived at a position immediately upstream of the checking position 12, slides in front of the verification device 14, and the batch 7 of cigarettes contained therein is examined layer by layer by the three detector elements 15, 16 and 17.

By way of an example, consideration will now be given to the detector element 15 in respect of the upper layer 9 and to the behavior of the signal present at the terminal 24. Whenever the ray coming from the photoemitter element 18 hits the end of a cigarette 8 that is in a condition of perfect filling, the voltage at the terminal 24 adopts a value close to 0.

In such cases, in fact, the ray of reflected light that hits the photosensitive element 19 is of such intensity as to virtually cause a short-circuit between the emitter and the collector, on which the ground voltage is present.

In the case, instead, of cigarettes with insufficient end filling, the ray of light is, because of the distance the detector element is away from the reflecting surface in comparison with the previously mentioned case, of a lesser reflected intensity.

For this reason the internal resistance of the phototransistor 19 and, therefore, the voltage at the terminal 24 undergo an increase.

In the particular instance when the third and fifth cigarette in the layer under consideration have end filling faults, the signal C (see FIG. 5) is present at the terminal 24; the signal in question is virtually horizontal, is of am amplitude close to 0 at the time cigarettes in a perfectly filled condition are being examined but has two voltage peaks at the time the third and fifth cigarettes are being examined.

The voltage peaks vary in amplitude since the filling condition is not the same end, on account of the foregoing, the condition of the third cigarette can be seen to be worse than that of the fifth.

The signal C in FIG. 5, amplified by the operational amplifier 25, is compared, by means of the comparator 27, with a threshold voltage which, in the case under consideration, is of an intermediate value between the amplitudes of the two voltage peaks consequential to the examination of the third and fifth cigarette (see the signals D and E in FIG. 5).

At the output of the comparator 27, the signal F in FIG. 5 is present. The voltage peak applicable to the checking of the fifth cigarette is eliminated since the amplitude thereof is of a lesser value than the selected threshold voltage.

The rheostat 28, making possible alteration of the value of the threshold voltage of the comparator 27, thus constitutes means for regulating the sensitivity of the detector element 15.

At the three terminals 30, 31 and 32, in respect of the three detector elements 15, 16 and 17, are present (during each verification operation) three signals of the signal F type in FIG. 5. That is to say, logical level 1 signals are generated when cigarettes are in a correctly filled condition, and logical level 0 signals when faulty cigarettes are present.

The terminals 30, 31 and 32 are connected to the NAND element 38, at the output of which even one single logical level 0 impulse at one of the three inputs determines a logical level 1 impulse.

However, while the signals present at the terminals 30 and 32 are supplied directly to the NAND element 38, the signal present at the terminal 31, reversed by the NAND element 39, is blocked by the NAND element 40 for a period of time in between t1, for the emission of the cycle commencement impulse on the part of the device 34, and a moment t2 corresponding to the trailing edge of the first consent impulse (see signals A and B in FIG. 5)

It should be noted that because of the particular conformation of the batch of cigarettes and the staggered arrangement of the three detector elements, the detector element 16 only starts to examine the first cigarette in the middle layer 11 when the detector elements 15 and 17 commence the examination of the second cigarette in the layers 9 and 10, respectively.

During the t1-t2 time span, therefore, the block 43 sends to the output terminal 41 a logical level 0 signal to inhibit on the part of the NAND element 40, the passing of the signal present at the terminal 31.

Commencing at the moment t2, at the output of the block 43 is present a logical level 1 signal of consent for the NAND element 40 to pass on the signal applicable to the examination of the middle layer 11.

Assuming that in the bottom layer 10 and in the middle layer 11 no faulty cigarettes are present, at the output of the NAND element 38 is present the signal F in FIG. 5; that is to say, a logical level 1 signal that becomes a logical level 0 signal at the time of the examination of the third cigarette in the upper layer 9 on the part of the detector element 15.

The signal B in FIG. 5 at the second input of the NAND element 47 gives its consent to the passing on of the signal F only at a time corresponding to the emission of the logical level 1 impulses that are emitted at the time of the examination of the central areas of the ends of the cigarettes on the part of the detector elements 15, 16 and 17.

In the case under consideration, at the output terminal of the NAND element 47 and thus at the input of the flip-flop 48 is present the signal G in FIG. 5. Present at the output terminal 49 there is the signal H in FIG. 5, that is to say, a logical level 0 signal that becomes a logical level 1 signal the moment when the said logical level 0 impulse is present at the output of the NAND element 47, namely upon the examination of the third cigarette in the upper layer 9.

The signal H in FIG. 5, the dispatch of which to the ejector device 51 is delayed by the device 50 for a number of cycles that depends on the distance between the said detector device 14 and the said device 51, constitutes the signal for the operation of the said ejector device 51.

In the presently described embodiment in accordance with the invention, the device 14 carries out a check on one single end of the cigarettes 8 and is obviously able to detect the incompleteness of the batches 7.

If it is desired to also verify the filling condition of the second end of each cigarette, or eventually to also check the presence of a filter in the case of filter cigarettes, all that needs to be done is to place a second set of detector elements 15, 16 and 17 in the region of the second extremity of the cigarettes.

To each of the said elements is connected a circuit of the type shown in FIG. 3, and the relevant output terminals of the said circuits converge into the NAND element 38.

It is clear that modifications and variations which do not deviate from the present invention may occur to one of ordinary skill in the art, and are intended to be included within the appended claims.

In particular, the detector elements, which in the case described are constituted by miniaturized reflection photocells, can be replaced with elements of another type, pressure transducers, for example, In such cases, the photoemitter elements are substituted with pneumatic elements that direct a blast of air onto the ends of the cigarettes as the compartments 3 pass into the checking position 12.

To conclude, it should be noted that the succession of consent impulses emitted at each cycle by the device 34 could be replaced by one single consent signal of a duration corresponding to the time taken to perform the vertification operation on all the cigarettes in one layer.

What is claimed is:

1. A device for transferring and verifying batches of cigarettes, comprising:
   conveyor means for moving said batches, said means having compartments for holding said batches of cigarettes placed transversely with respect to the direction in which the conveyor means moves forward, and arranged in layers at different levels with respect to said conveyor means;
   means for checking at least one end of each of said cigarettes; and
   means for ejecting batches that are incomplete or contain at least one faulty cigarette;
   said means for checking comprising:
   a detecting element for each of said layers of cigarettes arranged to detect the continguous ends of the grouped cigarettes of a batch, a first circuit block means for each of the said detecting elements, for producing a signal corresponding to an operation of checking a layer for indicating the existence of a faulty cigarette in a batch, link means, connected to mechanical means for driving said conveyor, for producing a cyclic signal for synchronizing the checking operation of a layer, said cyclic signal comprising a succession of impulses synchronizing the moments when said detector elements examine central areas of the ends of the cigarettes, a second circuit block means for synchronizing with said cyclic signal and for operating said ejector means in response to said first circuit block means signals, and circuit means for selectively inhibiting the response of said second block means to the signal produced by one of said first circuit block means.

2. A device according to claim 1, wherein each of said first circuit block means comprises a decision element for converting the output signal from its respective detecting element into logical signals at two levels, and a means for regulating the sensitivity of said detector element.

* * * * *